United States Patent [19]
Schmitt et al.

[11] Patent Number: 5,171,959
[45] Date of Patent: Dec. 15, 1992

[54] ARC WELDING OF A WELD STUD

[75] Inventors: Klaus G. Schmitt, Giessen; Harald Knetsch, Herborn; Wolfgang Obermann, Giessen; Wolfgang Schmidt, Reiskirchen, both of Fed. Rep. of Germany

[73] Assignee: Emhart Inc., Newark, Del.

[21] Appl. No.: 805,674

[22] Filed: Dec. 21, 1991

[30] Foreign Application Priority Data

Dec. 18, 1990 [DE] Fed. Rep. of Germany ....... 4040509

[51] Int. Cl.$^5$ ................................. B23K 9/20
[52] U.S. Cl. ........................................ 219/98
[58] Field of Search ................... 219/98, 99

[56] References Cited

U.S. PATENT DOCUMENTS

| | | |
|---|---|---|
| 3,519,787 | 7/1970 | Kroy ........................... 219/98 |
| 3,526,742 | 9/1970 | Hill ............................ 219/98 |
| 4,797,529 | 1/1989 | Schmitt et al. ............ 219/98 |

Primary Examiner—Clifford C. Shaw
Attorney, Agent, or Firm—Spencer T. Smith

[57] ABSTRACT

Process for welding a weld stud onto a workpiece by means of a drawn arc, in which the weld stud is placed onto the workpiece and, with performance of a welding stroke, is removed from the workpiece in a return stroke, igniting a pilot arc, and is advanced toward the workpiece again in a forward stroke during the combustion of a connected welding arc. The welding arc is divided by pulse-wise current reduction to a minimum value into a sequence of current pulses and the last of these current pulses is extended in time by at least about 1.5 times relative to the preceding current pulses. This extended current pulse lasts substantially to the end of the forward stroke.

2 Claims, 1 Drawing Sheet

FIG. 1
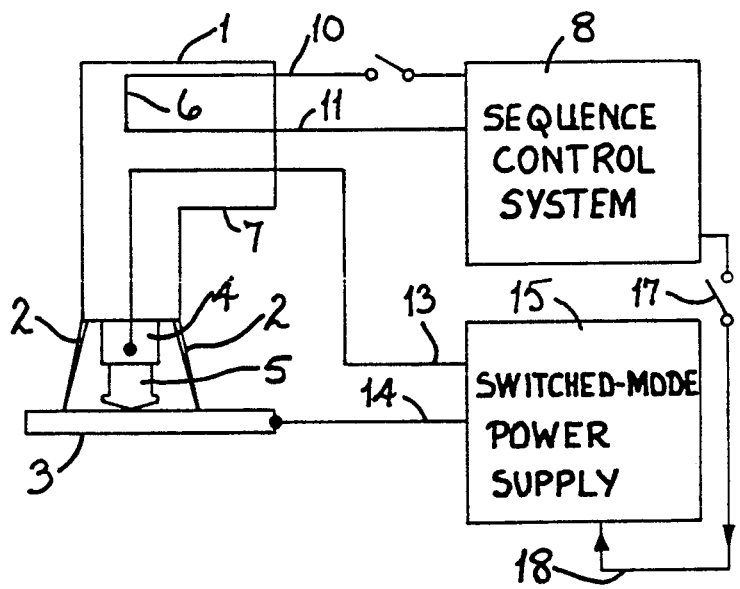
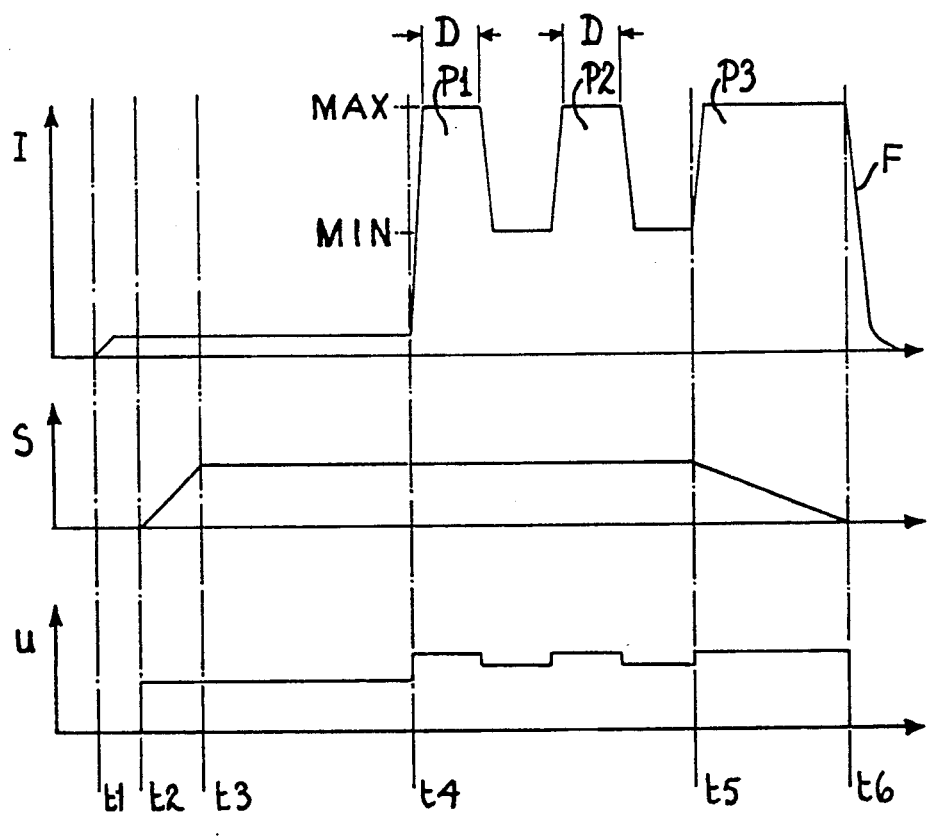
FIG. 2

ARC WELDING OF A WELD STUD

BACKGROUND OF THE INVENTION

The present invention relates to a process for welding a weld stud onto a workpiece by means of a drawn arc.

In such a process, a weld stud is removed from contact with a workpiece in a return stroke whereby a pilot arc is struck and then returned toward the workpiece in a forward stroke during the burning of a welding arc. Our German Patent specification DE 36 11 823 describes such a process.

The known process serves to recognise and compensate welding conditions which differ from one welding point to another in order to obtain perfect welds despite finding undesirable conditions at the respective welding point. For this purpose, utilising the pilot current arc and the voltage emerging at it, the height or the duration of the welding arc is set using a correspondingly adjustable welding power supply unit as required by the conditions prevailing in each case.

It has been found that the welding of weld studs by means of a drawn arc leads to difficulties when applied to workpieces consisting of thin sheet metal and having a thickness of, for example, 0.7 mm insofar as the metal sheets are penetrated so that they are partially welded through, i.e. undesirable liquefaction of the sheet metal material occurs on the side remote from the actual welding point.

The object of the invention is to provide a stud welding process according to the foregoing details which is particularly advantageous for use on thin sheet metal, for example sheet metal having a thickness of 0.7 mm and below.

BRIEF DESCRIPTION OF THE INVENTION

According to the present invention, a process for welding a weld stud onto a workpiece by means of a drawn arc in which a weld stud is removed from contact with a workpiece in a return stroke whereby a pilot arc is struck and then returned toward the workpiece in a forward stroke during the burning of a welding arc is characterised in that the welding arc is divided by pulse-wise current reduction to a minimum value (MIN) into a sequence of current pulses and the last of these current pulses is extended in time by at least about 1.5 times relative to the preceding current pulses and this extended current pulse lasts substantially to the end of the forward stroke.

Surprisingly it has been found that a welding arc of a specific duration which has been found to be the minimum required for the welding of a weld stud to a metal sheet with constant current level can be reduced considerably pulse-wise, in particular several times, for the duration of the welding arc and this results in a corresponding reduction of the energy supply to the welding point if the last of the emerging current pulses is extended in order again to give the welding point an increased energy supply in this extended phase of the current pulse terminating the arc, the energy supply which is reduced during the inter-pulse periods being partially compensated by this increased energy supply. As the extension of the last current pulse occurs substantially for the duration of the forward stroke to the end thereof, this ensures that the weld stud dips into a completely liquefied welding point and is consequently welded over its entire face to the metal sheet.

A further surprising effect is that spattering of liquefied metal occurring during immersion of the weld stud into the melt is substantially reduced when applying the process according to the invention. This can be explained as follows: during combustion of the welding arc with full current intensity, a relatively large cross section of the welding arc appears, which extends over the entire area of the end face of the weld stud to be welded and consequently heats the metal sheet over a relatively large area. Owing to the pulse-wise reduction of the current intensity of the welding arc there occurs a correspondingly pulse-wise reduction of the cross section of the welding arc which concentrates substantially on the central region of the welding point so that the edge regions of the welding point can cool again somewhat. As a result, heat can flow outwardly again from the metal sheet in the region of the welding point, counteracting the tendency of through-welding. If the extended current pulse comes into effect at the end of the welding operation, the extended current pulse is pre-heated to a considerable extent, in particular in the outer regions of the welding point, so that, owing to the extended current pulse, a significantly smaller supply of energy is required for completing welding than when employing a welding arc of constant current intensity.

The foregoing explanation also shows that the process according to the invention requires a smaller supply of energy than the known process in which a welding current of constant intensity is employed. This smaller supply of energy manifests itself in a correspondingly smaller power requirement of a switched-mode power supply delivering the welding current and in correspondingly smaller losses on the supply lines to the welding point, which also applies to the application of the process according to the invention to thicker metal sheets.

It is also pointed out that it is known from DE-OS 36 07 547 to superimpose a pulse frequency on the welding current during arc welding with welding wire. This is carried out in order to heat considerably a welding bead which is suspended on the welding wire held constantly at a distance from the welding point by the sudden increase in the welding current between the pulse-wise reductions, and thus to cause it to separate from the end of the welding wire.

To allow adaptation to various types of material, sheet metal thicknesses, sheet metal coatings and the like, the current pulses are preferably variable with respect to their height and their minimum value. Furthermore, the pulse duty factor (duty cycle) of the current pulses is also preferably designed so as to be variable. Finally, it is also possible to vary the current pulses with respect to their frequency.

BRIEF DESCRIPTION OF THE DRAWINGS

In order that the present invention be better understood, a preferred embodiment will be described in greater detail by way of example with reference to the accompanying drawings in which:

FIG. 1 shows a block circuit diagram of the control circuit forming the basis of the process of the present invention, with a basic representation of the welding device; and FIG. 2 is a graph showing the timing of the welding current, of the weld stud stroke and of the welding voltage.

DETAILED DESCRIPTION OF DRAWINGS AND PREFERRED EMBODIMENT

FIG. 1 shows a schematic illustration of a welding gun 1. Three supporting feet 2 which are placed onto the workpiece 3 project from the front end of the welding gun 1. A stud holder 4, which carries a weld stud 5 at its front end, is located between the supporting feet 2. The stud holder 4 can be retracted in a known manner by means of solenoid 6 into the stud welding gun 1 against the tension of a spring (not shown). When the solenoid 6 is switched on, the stud holder 4 is retracted together with the weld stud 5 by up to 1.5 mm into the stud welding gun 1 (return stroke). When the solenoid 6 is switched off, the stud holder 4 is then driven forward again together with the weld stud 5 owing to the spring tension (forward stroke). These steps and the components required to produce them are known.

A number of lines which are required for normal operation of the stud welding gun 1 run into handle 7 of the stud welding gun 1. The exciting current circuit for the solenoid 6 extends via lines 10 and 11. Line 13, which carries the current of the pilot arc as well as the current of the welding arc, also extends from the handle 7. The workpiece 3 is also connected to line 14, producing a circuit containing line 13, stud holder 4, stud 5, workpiece 3 and line 14. Lines 10 and 11 are connected to sequence control system 8, which represents a known module and is constantly used in this form in conjunction with stud welding guns. The lines 13 and 14 are connected to switched-mode power supply 15 which delivers the current for the pilot arc and the welding arc. Sequence control system 8, details of which will be given below, actuates, in a known manner, switch 16 with which the exciting current circuit for the solenoid 6 is switched on at moment t2 and is switched off at moment t5 (FIG. 2).

According to FIG. 2, switch 17 is closed at moment t1 and then applies the control voltage via line 18 for basic control of the switched-mode power supply 15 to control input 19 thereof, whereupon the control input 19 is switched on and delivers a defined current via the lines 13 and 14 to stud holder 4, stud 5 and workpiece 3 as a function of the level of the control voltage prevailing at control input 19. With this basic control means, and assuming that normal welding conditions prevail, the switched-mode power supply 15 is set for an optimally running welding operation, more specifically with respect to pilot current and welding current. At moment t2 switch 16 is closed owing to a further impetus in the sequence control system 8, whereupon solenoid 6 receives voltage and attracts. It then lifts stud holder 4 with stud 5 of the workpiece 3 and, in this way, breaks the contact between the weld stud and workpiece 3. The pilot arc is consequently drawn, the current required for this purpose flowing via lines 13 and 14.

At moment t4, an increased control voltage is supplied from sequence control system 8 to the switched-mode power supply 15 via line 18 and switches the switched-mode power supply 15 from pilot current to welding current. At moment t5, owing to a corresponding impetus from sequence control system 8, the solenoid 6 of welding gun 1 is switched off by opening switch 16 so that stud 5 is moved toward workpiece 3 during the period t5 to t6 and finally impinges on it where, in a known manner, it finds molten material and is therefore welded to workpiece 3. As stud 5 impinges upon workpiece 3 at moment t6, a short circuit arises between stud 5 and workpiece 3 and leads to the collapse of the arc voltage (see curve of arc voltage at moment t6 in FIG. 2).

FIG. 2 shows a graph of the timing of the welding current I, including the timing of the weld stud travel S and including the timing of the welding current U. In addition to the foregoing explanations, the trend of the current I of the welding arc between moments t4 and t6 is now illustrated. As already mentioned above, the welding arc is connected at moment t4 by the sequence control system and, according to the time constant for the current rise determined by the basic circuit, reaches its maximum value MAX which corresponds to the current value of the welding arc normally set during stud welding. The welding arc is reduced pulse-wise twice until moment t5, more specifically until the minimum MIN in each case so that the two current pulses P1 and P2 which each have the same pulse duration D are initially formed. The extended current pulse P3 then follows the current reduction following the current pulse P2, lasts from moment t5 to t6 and fades to the value 0 via the rear edge F according to the inductance necessarily contained in the circuit.

The lower graph showing the voltage U of the welding arc reveals that the voltage occurring on the welding arc in the region between moments t4 and t6 changes slightly, more specifically following the pulse-wise reduction of the welding current.

On the basis of a sheet metal thickness of about 1 mm and a diameter of the welding face of the weld stud of about 10 mm, the following periods normally occur:

Period t1–t4 (combustion of the pilot arc) about 40 ms, for period t4–t6 (connection of the welding arc) about 50 ms.

The duration of the current pulses p1 and p2 is about 9 ms and of the extended current pulse p3 about 14 ms.

We claim:

1. A stud welding tool comprising
    means for supporting a stud at a selected distance from a workpiece for at least a predetermined period of time and for then displacing the supported stud into engagement with the workpiece,
    a power supply for delivering current to said supporting means, said current being a function of applied voltage, said power supply including
    means for alternately applying a plurality of substantially constant maximum and minimum voltages during said predetermined period of time, said alternately applying means including means for applying said substantially constant maximum voltage continuously for a selected duration, and
    means for continuously applying said maximum voltage for a duration substantially longer than said selected duration as the supported stud is displaced into engagement with the workpiece.

2. A stud welding tool according to claim 1, wherein said maximum voltage is applied for substantially the entire time while the supported stud is being displaced into engagement with the workpiece and said alternately applying means including means for applying said substantially constant minimum voltage for said selected duration.

* * * * *